US012055943B2

(12) United States Patent
Takao et al.

(10) Patent No.: US 12,055,943 B2
(45) Date of Patent: Aug. 6, 2024

(54) PALLET DETECTION DEVICE, FORKLIFT, PALLET DETECTION METHOD, AND PROGRAM

(71) Applicant: Mitsubishi Logisnext Co., Ltd., Nagaokakyo (JP)

(72) Inventors: Kenji Takao, Tokyo (JP); Takumi Fujita, Tokyo (JP); Katsumasa Kitajima, Tokyo (JP); Yusuke Kinouchi, Tokyo (JP)

(73) Assignee: MITSUBISHI LOGISNEXT CO., LTD., Nagaokakyo (JP)

( * ) Notice: Subject to any disclaimer, the term of this patent is extended or adjusted under 35 U.S.C. 154(b) by 432 days.

(21) Appl. No.: 17/401,824

(22) Filed: Aug. 13, 2021

(65) Prior Publication Data

US 2022/0066464 A1 Mar. 3, 2022

(30) Foreign Application Priority Data

Aug. 31, 2020 (JP) ................................. 2020-145789

(51) Int. Cl.
*G05D 1/00* (2024.01)
*B66F 9/06* (2006.01)
(Continued)

(52) U.S. Cl.
CPC ........... *G05D 1/0242* (2013.01); *B66F 9/063* (2013.01); *G01S 17/89* (2013.01); *G01S 17/931* (2020.01)

(58) Field of Classification Search
None
See application file for complete search history.

(56) References Cited

U.S. PATENT DOCUMENTS 9,056,754 B1 * 6/2015 Wong .................... G05D 1/0274
9,206,023 B2 * 12/2015 Wong ...................... G01S 17/86
(Continued)

FOREIGN PATENT DOCUMENTS

JP 11-278799 A 10/1999
JP 2016-210586 A 12/2016
(Continued)

OTHER PUBLICATIONS

Walter et al., "Closed-loop Pallet Manipulation in Unstructured Environments", The 2010 IEEE/RSJ International Conference on Intelligent Robots and Systems Oct. 18-22, 2010, Taipei, Taiwan, p. 5119-5126.

*Primary Examiner* — James M McPherson
(74) *Attorney, Agent, or Firm* — Birch, Stewart, Kolasch & Birch, LLP

(57) ABSTRACT

Pallet detection device that acquires point cloud data indicating a point cloud measured by a two-dimensional distance measurement device on a depth map; detects a straight line corresponding to a front surface of a pallet based on the point cloud in a region presumed to include the front surface of the pallet in the point cloud data; detects a line segment indicating the front surface of the pallet based on the straight line; acquires position and orientation of the pallet based on the line segment. Acquires one or more straight line candidates and assigns for each of the one or more straight line candidates a score to the point cloud and selects the straight line from the one or more straight line candidates based on a score accumulated value obtained by accumulating the score for the point cloud in the region presumed to include the front surface of the pallet.

17 Claims, 12 Drawing Sheets

(51) Int. Cl.
*G01S 17/89* (2020.01)
*G01S 17/931* (2020.01)

(56) References Cited

U.S. PATENT DOCUMENTS

| | | | |
|---|---|---|---|
| 9,635,346 B2* | 4/2017 | Iida | B66F 9/063 |
| 2013/0101230 A1* | 4/2013 | Holeva | B66F 9/24 |
| | | | 382/224 |
| 2018/0134531 A1* | 5/2018 | Tanaka | G05D 1/0225 |
| 2018/0155169 A1 | 6/2018 | Tanaka et al. | |
| 2022/0267128 A1* | 8/2022 | Han | G05D 1/0274 |

FOREIGN PATENT DOCUMENTS

| | | |
|---|---|---|
| JP | 2020-23397 A | 2/2020 |
| JP | 2020-33165 A | 3/2020 |

* cited by examiner

PALLET DETECTION DEVICE, FORKLIFT, PALLET DETECTION METHOD, AND PROGRAM

TECHNICAL FIELD

The present disclosure relates to a pallet detection device, a forklift, a pallet detection method, and a program.

BACKGROUND

Forklifts are widely used to transport goods by inserting forks into holes in pallets. Automated guided forklifts (AGFs) have been developed to provide this type of transport unmanned.

If the pallet is placed in a predetermined position and orientation (rotational angle in plan view), the AGF can insert the fork into holes of the pallet according to an approach path. However, although the actual pallet is placed so as to fit in a predetermined area (slot), the position and orientation in the slot varies with each placement. Therefore, it is possible that the AGF which only inserts the fork according to the approach path cannot insert the fork into holes of the pallet.

To solve this problem, a method for detecting the position and orientation of the pallet has been proposed. For example, it is known that 3D-LiDAR (LiDAR: Light Detection And Ranging), 2D-LiDAR, or 3D cameras are used to acquire three-dimensional data of the pallet to detect the position and orientation of the pallet.

In the method using 2D-LiDAR, it is necessary to measure the pallet while moving the laser up and down in order to acquire three-dimensional data of the pallet. For example, Patent Document 1 discloses the acquisition of three-dimensional distance images while moving the laser sensor in the vertical direction to acquire three-dimensional data of the pallet.

CITATION LIST

Patent Literature

Patent Document 1: JP2016-210586A

SUMMARY

Problems to be Solved

Since 3D-LiDAR is very expensive, there is a cost problem in mounting it on a forklift. In addition, 3D cameras are not very convenient because their applicability is limited due to the degradation of accuracy by sunlight and the limitations of the distance and viewing angle that can be measured. Therefore, it is desirable to use 2D-LiDAR to detect the position and orientation of the pallet.

In Patent Document 1, by acquiring three-dimensional data of the pallet while moving the laser sensor in the vertical direction, a straight line corresponding to the front surface of the pallet is extracted based on a group of observation points on the same plane obtained by reflected light from the front surface of the pallet. However, this method requires the laser sensor to be moved in the vertical direction, which makes the measurement time consuming.

In view of the above, an object of the present disclosure is to provide a pallet detection device that can accurately extract a straight line corresponding to the front surface of a pallet without moving a two-dimensional distance measurement device in the vertical direction and detect the position and orientation of the pallet in a short time.

Solution to the Problems

A pallet detection device according to the present disclosure comprises: a point cloud acquisition unit configured to acquire point cloud data indicating a point cloud measured by a two-dimensional distance measurement device on a depth map; a straight line detection unit configured to detect a straight line corresponding to a front surface of a pallet based on the point cloud in a region presumed to include the front surface of the pallet in the point cloud data; a line segment detection unit configured to detect a line segment indicating the front surface of the pallet based on the straight line; and a position/orientation acquisition unit configured to acquire position and orientation of the pallet based on the line segment. The straight line detection unit acquires one or more straight line candidates as candidates for the straight line, assigns, for each of the one or more straight line candidates, a score to the point cloud so that points in front of the straight line candidate at a specified distance or more are assigned with a score with a constant whose priority in selection is lower than the rest of points, and selects the straight line from the one or more straight line candidates based on a score accumulated value obtained by accumulating the score for the point cloud in the region presumed to include the front surface of the pallet.

A forklift according to the present disclosure comprises: the above-described pallet detection device; a two-dimensional distance measurement device for acquiring a point cloud; and a driving unit configured to perform transport of a pallet according to a detection result of the pallet detection device.

A pallet detection method according to the present disclosure comprises: acquiring point cloud data indicating a point cloud measured by a two-dimensional distance measurement device on a depth map; detecting a straight line corresponding to a front surface of a pallet based on the point cloud in a region presumed to include the front surface of the pallet in the point cloud data; detecting a line segment indicating the front surface of the pallet based on the straight line; and acquiring position and orientation of the pallet based on the line segment. The detecting the straight line includes acquiring one or more straight line candidates as candidates for the straight line, assigning, for each of the one or more straight line candidates, a score to the point cloud so that points in front of the straight line candidate at a specified distance or more are assigned with a score with a constant whose priority in selection is lower than the rest of points, and selecting the straight line from the one or more straight line candidates based on a score accumulated value obtained by accumulating the score for the point cloud in the region presumed to include the front surface of the pallet.

A program according to the present disclosure is configured to cause a computer to execute: a process of acquiring point cloud data indicating a point cloud measured by a two-dimensional distance measurement device on a depth map; a process of detecting a straight line corresponding to a front surface of a pallet based on the point cloud in a region presumed to include the front surface of the pallet in the point cloud data; a process of detecting a line segment indicating the front surface of the pallet based on the straight line; and a process of acquiring position and orientation of the pallet based on the line segment. The process of detecting the straight line includes acquiring one or more straight line candidates as candidates for the straight line, assigning, for each of the one or more straight line candidates, a score to the point cloud so that points in front of the straight line candidate at a specified distance or more are assigned with a score with a constant whose priority in selection is lower than the rest of points, and selecting the straight line from the one or more straight line candidates based on a score accumulated value obtained by accumulating the score for the point cloud in the region presumed to include the front surface of the pallet.

Advantageous Effects

The present disclosure provides a pallet detection device that can accurately extract a straight line corresponding to the front surface of a pallet without moving a two-dimensional distance measurement device in the vertical direction and detect the position and orientation of the pallet in a short time.

DETAILED DESCRIPTION

Figure 1A:
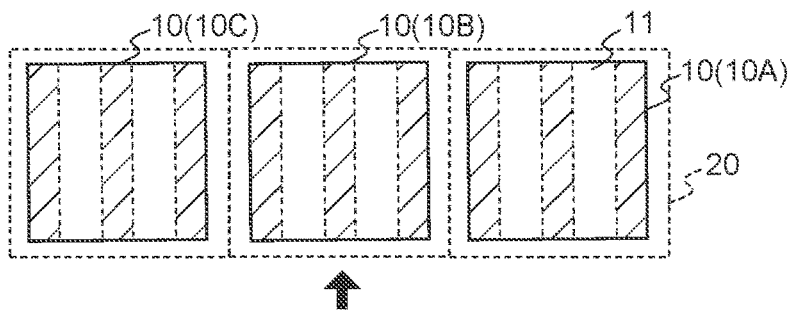
FIG. 1A is a plan view showing an example where pallets are placed at equal intervals.

Embodiments will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

(Usage Environment)

First, the usage environment of a forklift 200 equipped with a pallet detection device 100 according to an embodiment will be described. A pallet 10 is placed to fit into a predetermined area (slot 20).

As described later, the pallet detection device 100 can acquire information about the position of the slot 20, the dimension and shape of the pallet 10, the position of the forklift 200, and the position of a two-dimensional distance measurement device 30 (see FIGS. 2A and 2B). The two-dimensional distance measurement device 30 is, for example, a two-dimensional laser scanner, such as 2D-LiDAR, which measures the distance and direction to the measurement object in a certain measurement space region by scanning the measurement light horizontally and receiving the reflected light. In the following description, a set of measurement points acquired by the two-dimensional distance measurement device 30 will be referred to as a point cloud. The pallet 10 is placed so that, in plan view, the translational displacement and rotational angle relative to the center of the slot 20 are within certain limits. For example, the limits are a misalignment of 100 mm or less and an angular misalignment of 10° or less. The pallet 10 is placed on the floor, ground, etc., for example.

Figure 1B:
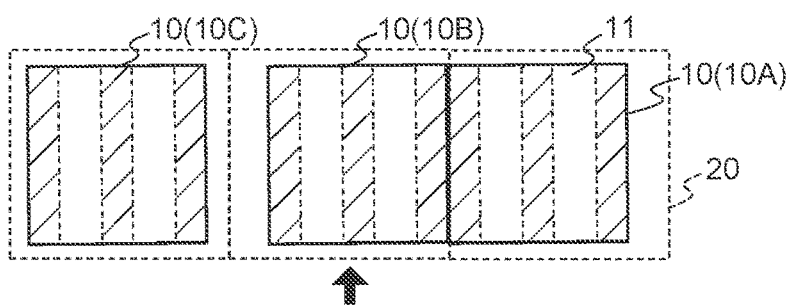
FIG. 1B is a plan view showing an example where pallets are in close proximity to each other.
Figure 1C:
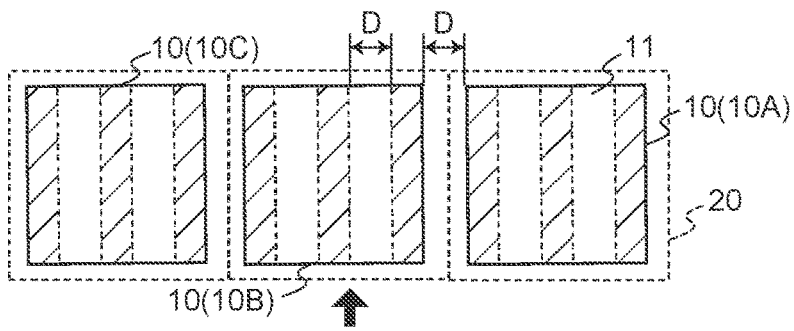
FIG. 1C is a plan view showing an example where pallets are placed at a spacing that is equal to the width of holes in the pallets.
Figure 1D:
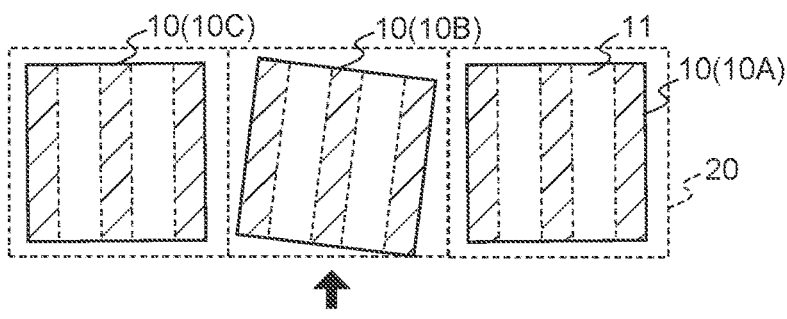
FIG. 1D is a plan view showing an example where a pallet is rotated relative to the slot.
Figure 1E:
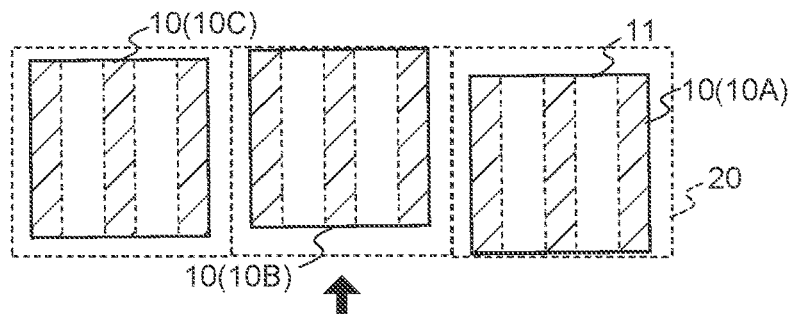
FIG. 1E is a plan view showing an example where a pallet is placed farther back than adjacent pallets.

Here, an arrangement example of pallets 10 will be described, and various problems to be solved by the pallet detection device 100 will be described. FIG. 1A is a plan view showing an example where pallets 10 (10A, 10B, 10C) are placed at equal intervals. FIG. 1B is a plan view showing an example where pallets 10 (10A, 10B) are in close proximity to each other. FIG. 1C is a plan view showing an example where pallets 10 (10A, 10B) are placed at a spacing that is equal to the width D of holes 11 in the pallets 10. FIG. 1D is a plan view showing an example where a pallet 10 (10B) is rotated relative to the slot 20. FIG. 1E is a plan view showing an example where a pallet 10 (10B) is placed farther back than adjacent pallets 10 (10A, 10C).

In these examples, three pallets 10 and slots 20 are adjacent to each other. The number of pallets 10 and the number of slots 20 are not limited to the illustrated examples. As shown in FIGS. 1A to 1E, each pallet 10 has two holes 11 into which a fork 201 of the forklift 200 is inserted in the width direction of the pallet 10. Each pallet 10 may have a plurality of sets of two holes 11 in the height direction of the pallet 10. As shown by the arrows in the figures, the two-dimensional distance measurement device 30 irradiates a measurement light (for example, a laser beam) toward the pallet 10 and scans in the horizontal direction. The front surface of the pallet 10 is a lower end surface in the figures.

In the example shown in FIG. 1A, three pallets 10 are placed at equal intervals in the centers of the respective slots 20, and each rotation angle with respect to the slot 20 is zero. This is the ideal arrangement. If such an arrangement can be realized each time the pallet is placed, the fork 201 can be inserted from the front only based on the positional relationship between the slot 20 and the forklift 200 without detecting the pallet. However, in practice, it is difficult to insert the fork 201 without detecting the pallet because the position and orientation of the pallet 10 in the slot 20 can vary within certain limits for example as shown in FIGS. 1B to 1E.

In the example shown in FIG. 1B, the middle pallet 10 (10B) and the right pallet 10 (10A) are close to each other, with almost no gap therebetween. In this case, even if the two-dimensional distance measurement device 30 simply acquires a point cloud P1, which is a set of measurement points, based on the reflected light from the pallet 10, it is difficult to identify the point cloud P1 for each pallet 10. For example, the middle pallet 10 (10B) and the right pallet 10 (10A) may be identified as one, or the boundary between the two may not be identified.

In the example shown in FIG. 1C, the spacing between the middle pallet 10 (10B) and the right pallet 10 (10A) are the same as the width D of the hole 11. In this case, even if the width of the region where the point cloud P1 acquired by the two-dimensional distance measurement device 30 does not exist is simply focused, the gap between the pallets 10 may not be distinguished from the hole 11.

In the example shown in FIG. 1D, the middle pallet 10 (10B) is rotated by 10° with respect to the slot 20. In this case, unless the orientation of the middle pallet 10 (10B) is detected, the fork 201 may not be inserted into the hole 11 due to angular deviation from the front direction.

In the example shown in FIG. 1E, the pallet 10 (10B) is placed farther back than flanking pallets 10 (10A, 10C). In this case, when detecting the front surface of the middle pallet 10 (10B), one of the front surfaces of the flanking pallets 10 (10A, 10C) located forward of the front surface of the middle pallet 10 (10B) may be erroneously detected as the front surface of the middle pallet 10 (10B).

(Configuration of Forklift)

Figure 2A:
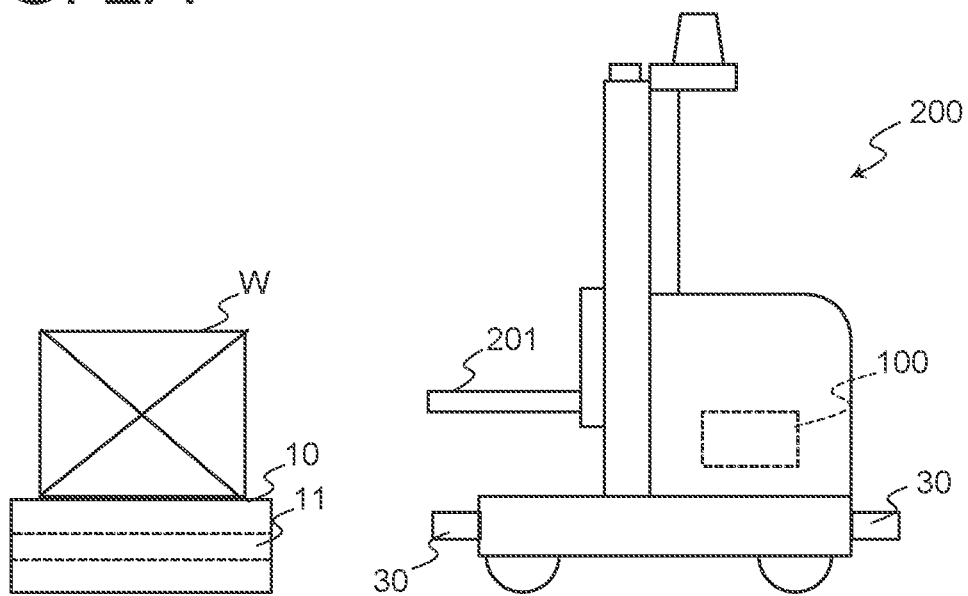
FIG. 2A is a schematic side view of a forklift according to an embodiment.

FIG. 2A is a schematic side view of the forklift 200 according to an embodiment. FIG. 2B is a schematic plan view of the forklift 200 according to an embodiment. For reference, these figures also show the pallet 10 on which a load W is placed.

Figure 2B:
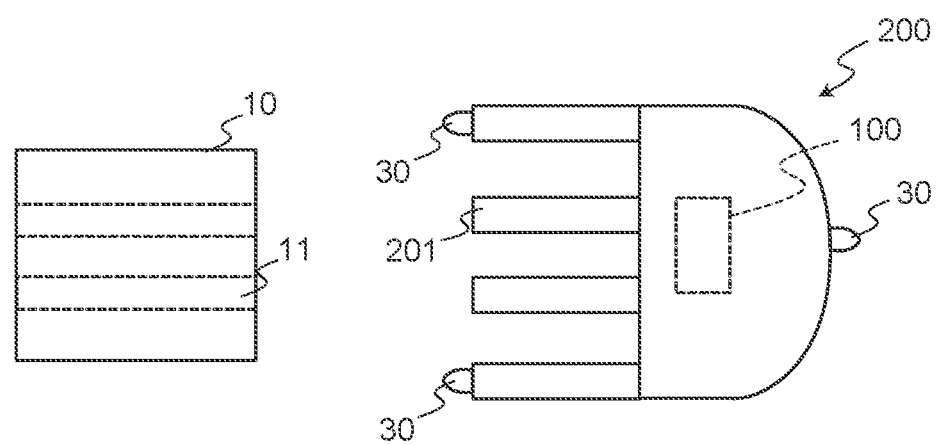
FIG. 2B is a schematic plan view of a forklift according to an embodiment.

As shown in FIGS. 2A and 2B, the forklift 200 includes a pallet detection device 100, three two-dimensional distance measurement devices 30 for acquiring a point cloud P1, and a driving unit (not shown) configured to perform transport of a pallet 10 according to a detection result of the pallet detection device 100. Generally, the AGF is equipped with a safety sensor (2D-LiDAR) having an obstacle detection function and an emergency stop function according to a safety standard. The two-dimensional distance measurement device 30 may be the safety sensor (2D-LiDAR).

The two-dimensional distance measurement device 30 as the safety sensor are disposed on the forklift 200, for example, two on the left and right sides on the side of the fork 201, and one in the center on the side opposite to the fork 201. These two-dimensional distance measurement device 30 are disposed below the height of the pallet 10. The pallet detection device 100 may be configured to detect the pallet 10 by a combination thereof. The position and the number of two-dimensional distance measurement devices 30 are not limited to the illustrated examples, and may be changed as appropriate.

(Configuration of Pallet Detection Device)

Figure 3:
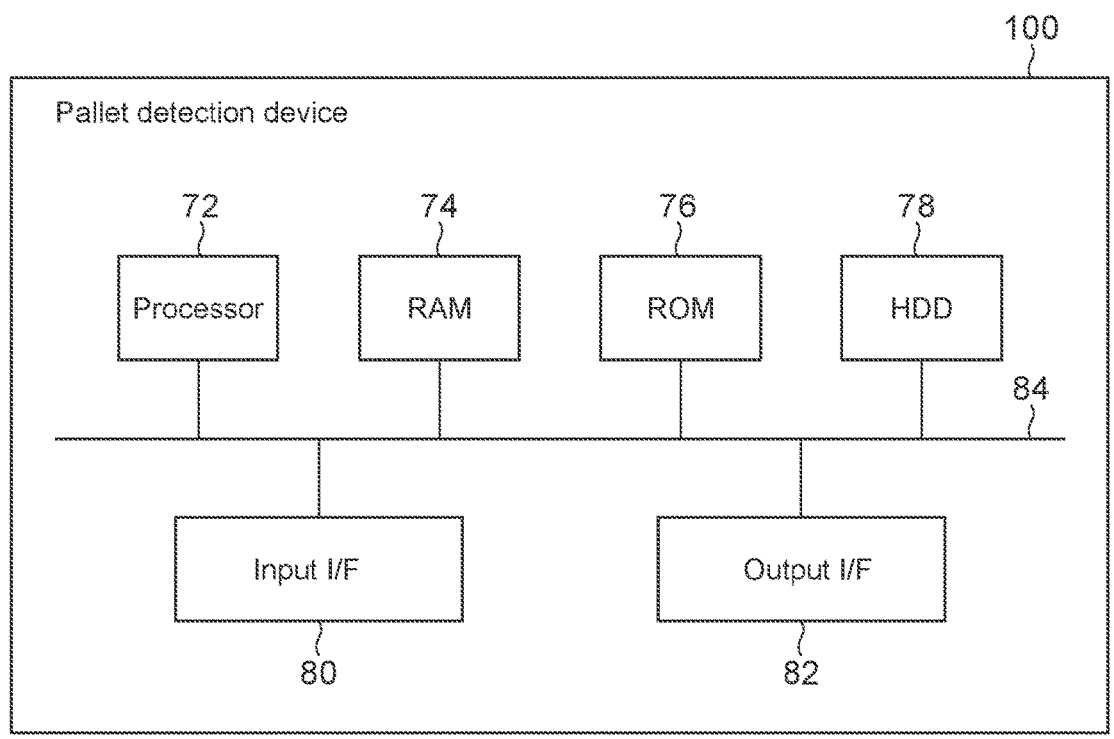
FIG. 3 is a schematic block diagram of a hardware configuration of a pallet detection device according to an embodiment.

The configuration of the pallet detection device 100 according to an embodiment will now be described. FIG. 3 is a schematic block diagram of a hardware configuration of the pallet detection device 100 according to an embodiment. For example, as shown in FIG. 3, the pallet detection device 100 is provided by a computer including a processor 72 such as a central processing unit (CPU) and a graphics processing unit (GPU), a random access memory (RAM) 74, a read only memory (ROM) 76, a hard disk drive (HDD) 78, an input I/F 80, and an output I/F 82, which are connected via a bus 84. The processor 72 of the pallet detection device 100 executes a program stored in the memory such as the ROM 76 and the RAM 74 to implement functions described later.

Figure 4:
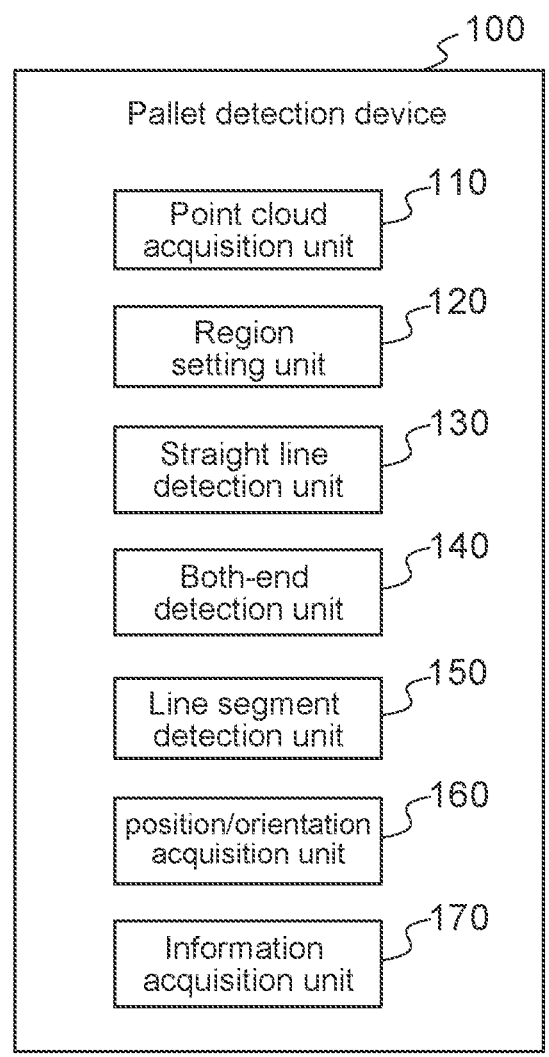
FIG. 4 is a schematic block diagram of a functional configuration of a pallet detection device according to an embodiment.

FIG. 4 is a schematic block diagram of a functional configuration of the pallet detection device 100 according to an embodiment. As shown in FIG. 4, the pallet detection device 100 includes, as functional units, a point cloud acquisition unit 110 configured to acquire point cloud data, a region setting unit 120 configured to set a detection target region, a straight line detection unit 130 configured to detect a straight line corresponding to the front surface of the pallet 10, a both-end detection unit 140 configured to detect both ends of the pallet 10, a line segment detection unit 150 configured to detect a line segment indicating the front surface of the pallet 10, a position/orientation acquisition unit 160 configured to acquire position and orientation of the pallet 10, and an information acquisition unit 170 configured to acquire information about the position.

(Flow of Pallet Detection)

The flow of a processing performed by the pallet detection device 100 according to an embodiment will now be described. Prior to this processing, the information acquisition unit 170 acquires information indicating the self-position (the position of the forklift 200) and information indicating the position of the slot 20 (the area in which the slot 20 is located). The information acquisition unit 170 may acquire such information by referring to the memory, or may acquire the information by communicating with a sensor (not shown) or a server device (not shown). For example, the position of the slot 20 is stored in a memory or a server device (not shown) in association with a map used in estimation of the self-position, and is read out by the information acquisition unit 170. This association is performed by the user.

Figure 5:
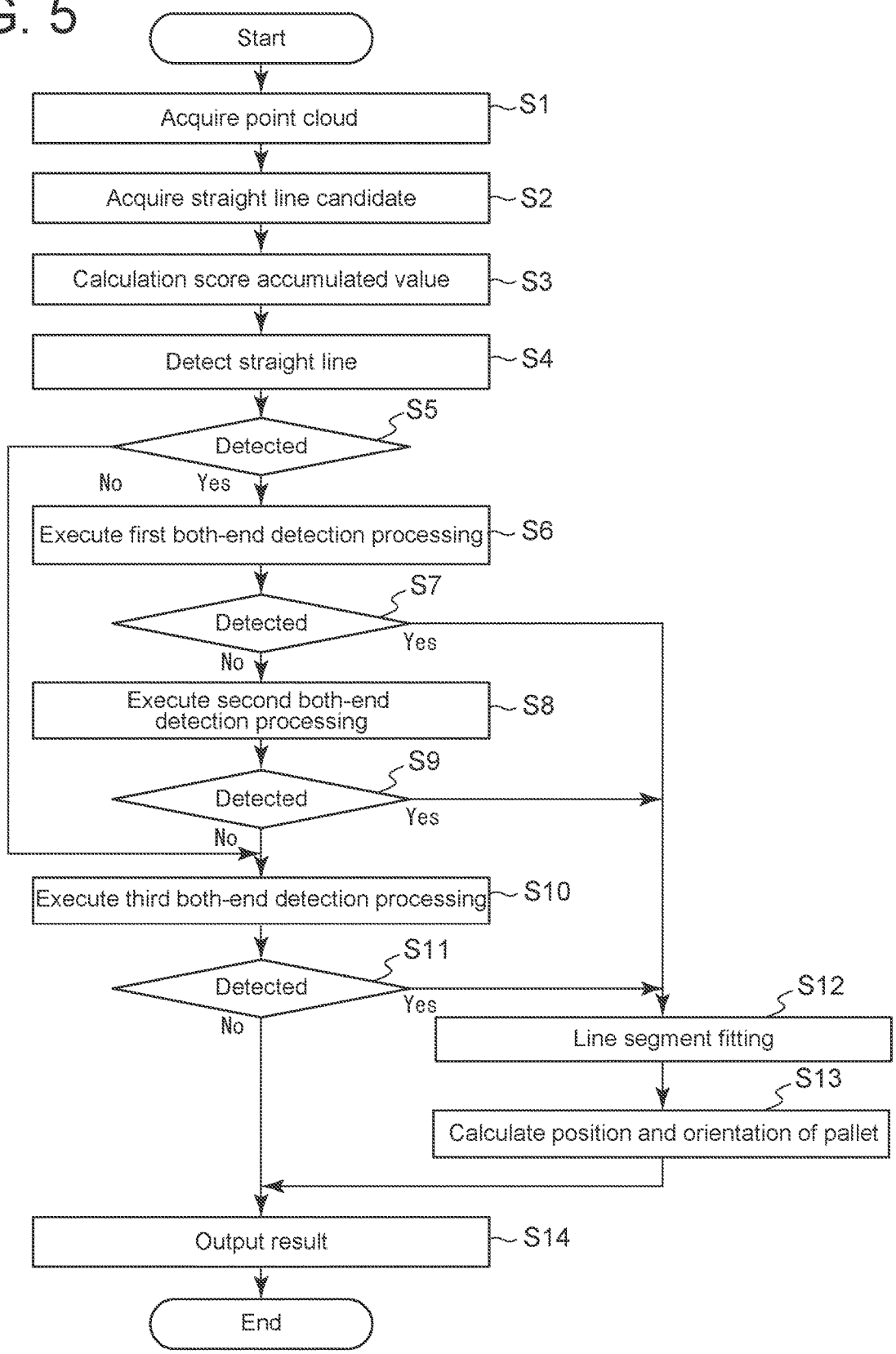
FIG. 5 is a flowchart for describing an example of a processing executed by a pallet detection device according to an embodiment.
Figure 6:
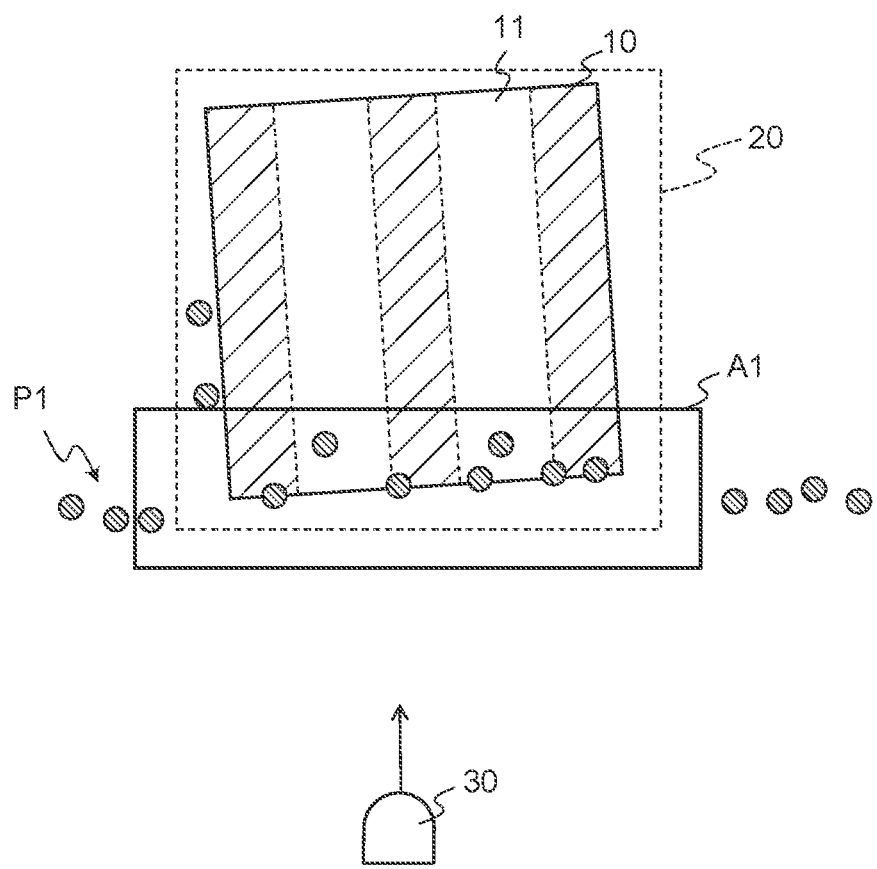
FIG. 6 is a schematic diagram showing an illustrative example of a point cloud acquired by a pallet detection device according to an embodiment.

FIG. 5 is a flowchart for describing an example of a processing executed by the pallet detection device 100 according to an embodiment. FIG. 6 is a schematic diagram showing an illustrative example of the point cloud P1 acquired by the pallet detection device 100 according to an embodiment. As shown in FIG. 5, the pallet detection device 100 approaches the vicinity of the pallet 10 based on the information indicating the self-position and the information indicating the position of the slot 20, and the two-dimensional distance measurement device 30 scans the measurement light in the horizontal direction and measures the reflected light from a certain measurement space region including the pallet 10 to acquire point cloud data (e.g., point cloud P1 shown in FIG. 6) (Step S1).

Specifically, first, the point cloud acquisition unit 110 acquires point cloud data indicating a point cloud P1 measured by the two-dimensional distance measurement device 30 on a depth map. The depth map is a map representing the fixed measurement space region in two dimensions in the depth direction and the width direction.

For example, as shown in FIG. 6, the point cloud acquisition unit 110 acquires a point cloud P1 around the pallet 10 to be measured by the two-dimensional distance measurement device 30. At this time, the point cloud acquisition unit 110 identifies a region presumed to include the front surface of the pallet 10 based on the information acquired by the information acquisition unit 170 and acquires the point cloud P1 around the pallet 10 based on the identification result. The point cloud P1 acquired by the point cloud acquisition unit 110 may be a superposition of point clouds P1 acquired from multiple two-dimensional distance measurement devices 30 (e.g., two or more of the three two-dimensional distance measurement devices 30 shown in FIGS. 2A and 2B). In this case, a dense point cloud P1 can be obtained. At this time, the pallet detection device 100 may acquire point cloud data obtained by superimposing point cloud data acquired from multiple two-dimensional distance measurement devices 30.

The pallet detection device 100 acquires one or more straight line candidates from the point cloud data. Specifically, first, the region setting unit 120 sets a detection target region. The detection target region is a so-called region of interest (ROI). For example, as shown in FIG. 6, the region setting unit 120 sets a first detection target region A1 having a width larger than the slot 20 to extract the point cloud P1 in the first detection target region A1. The straight line detection unit 130 acquires one or more straight line candidates for detecting a line segment indicating the front surface of the pallet 10. The straight line detection unit 130 assigns, for each of the one or more straight line candidates, a score to the point cloud P1 so that points P1 in front of the straight line candidate at a specified distance or more are assigned with a score with a constant whose priority in selection is lower than the rest of points P1. The straight line detection unit 130 selects the straight line corresponding to the front surface of the pallet 10 from the one or more straight line candidates based on a score accumulated value obtained by accumulating the score for the point cloud P1 in the region presumed to include the front surface of the pallet 10.

Figure 7:
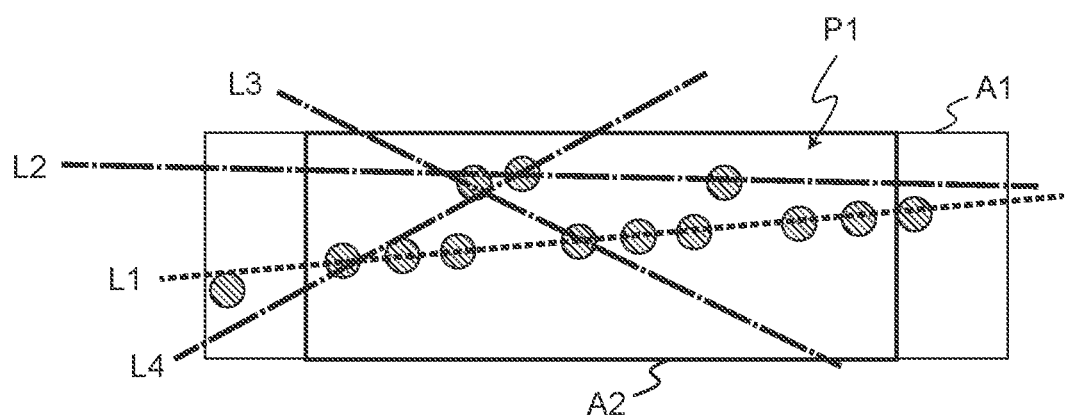
FIG. 7 is a schematic diagram showing an illustrative example of straight line candidates acquired by a pallet detection device according to an embodiment.

FIG. 7 is a schematic diagram showing an illustrative example of straight line candidates (straight line candidates L1, L2, L3, L4) acquired by the pallet detection device 100 according to an embodiment. For example, as shown in FIG. 7, the region setting unit 120 may further set a second detection target region A2 having a width smaller than the first detection target region A1, and the straight line detection unit 130 may acquire a straight line connecting two points selected from the point cloud P1 in the second detection target region A2 as the straight line candidate. For example, as shown in FIG. 7, the straight line detection unit 130 acquires four straight line candidates L1, L2, L3, L4 based on the point cloud P1. The width of the second detection target region A2 is set so that the adjacent pallet 10 does not enter. The width of the second detection target region A2 may be larger or smaller than that of the slot 20.

Illustrative examples of the method of acquiring straight line candidates will be described. The straight line detection unit 130 may be configured to acquire a straight line connecting two point selected by a RANSAC algorithm from the point cloud P1 in the detection target region as the straight line candidate. The detection target region in this case is the second detection target region A2. The detection target region may be the first detection target region A1, or may be a region different from the first detection target region A1 and the second detection target region A2. The RANSAC (RANdom Sample Consensus) is a method of randomly selecting two points and calculating an evaluation value. The detection method of the pallet 10 according to the present disclosure is not limited to the method using RANSAC, and other algorithms such as PROSAC (PROgressive Sample Consensus) may be used.

The straight line detection unit 130 may be configured to acquire a straight line connecting two points selected from the point cloud P1, one each from right and left sides of the widthwise center of the detection target region, as the straight line candidate. In this case, since the number of combinations is finite, all combinations of two points may be straight line candidates.

The pallet detection device 100 calculates the score accumulated value for each of the one or more straight line candidates (step S3). Further, the pallet detection device 100 detects the straight line corresponding to the front surface of the pallet 10 based on the score accumulated value (step S4). Specifically, the straight line detection unit 130 calculates the score accumulated value and detects the straight line corresponding to the front surface of the pallet 10 based on the score accumulated value. The straight line detection unit 130 may include points P1 outside the second detection target region A2 and within the first detection target region A1 in the straight line candidate having a high priority indicated by the score accumulated value and select (i.e., detect) this straight line candidate as the straight line corresponding to the front surface of the pallet 10. Such points P1 may also be subjected to a subsequent processing. For example, the straight line detection unit 130 selects the straight line candidate L1 shown in FIG. 7 as the straight line corresponding to the front surface of the pallet 10 based on the score accumulated value.

The score accumulated value will now be described. For example, in the case that a straight line candidate with a high score accumulated value is preferentially selected as the straight line to be used for line segment detection, "a score with a constant whose priority in selection is low" means a score with a value that decreases the score accumulated value. Conversely, in the case that a straight line candidate with a low score accumulated value is preferentially selected, "a score with a constant whose priority in selection is low" means a score with a value that increases the score accumulated value.

The straight line detection unit 130 uses a vertical distance between each measurement point constituting the point cloud P1 and the straight line candidate in calculating the score accumulated value. Specifically, the straight line detection unit 130 assigns a higher priority score to points P1 within a specified distance from the straight line candidate than to points P1 in front of the straight line candidate at the specified distance or more (when viewed from the measurement direction of the two-dimensional distance measurement device 30), and the closer to the straight line candidate, the higher the priority of the score. For example, the straight line detection unit 130 assigns a score with a negative constant to points P1 in front of the straight line candidate at the specified distance or more, and assigns a score with a positive constant to points P1 within the specified distance.

The positive score value is a variable depending on the distance from the straight line candidate.

Figure 8:
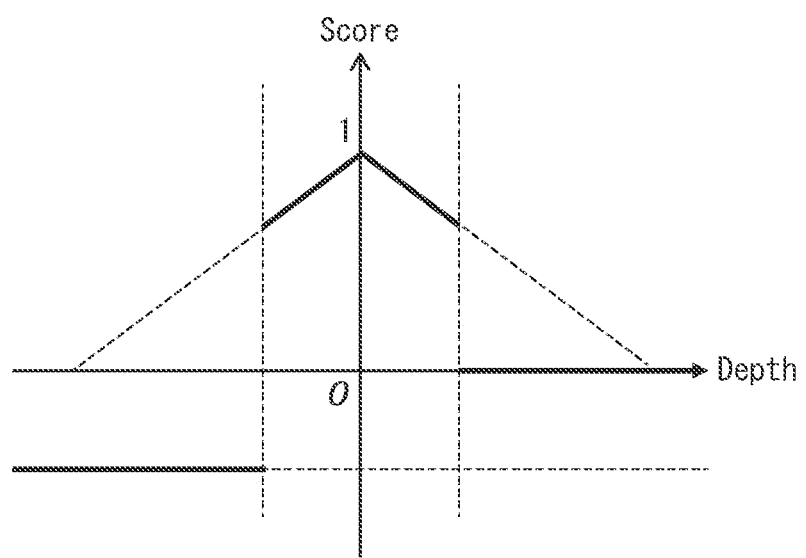
FIG. 8 is a graph showing an example of a score assigned by a pallet detection device according to an embodiment.

FIG. 8 is a graph showing an example of the score assigned by the pallet detection device 100 according to an embodiment. The horizontal axis of this graph corresponds to the depth, representing the distance between each point and the straight line candidate, and means that the further to the right in the horizontal direction, the further back (when viewed from the observation direction of the two-dimensional distance measurement device 30). The position where the depth is zero is the position of the straight line candidate. The vertical axis represents the value of the score. In the example shown in FIG. 8, points P1 in front of the straight line candidate at a specified distance or more are assigned with a score with a negative constant. Thus, a certain penalty is imposed on points P1 in front of the straight line candidate at a specified distance or more, regardless of the distance between the straight line candidate and each point. Points P1 within the specified distance from the straight line candidate are assigned with a positive score that is greater the closer it is to the candidate straight line.

In calculation of the score accumulated value, the straight line detection unit 130 excludes points P1 behind the straight line candidate at a specified distance or more from accumulation of the score accumulated value. The expression "excludes . . . from accumulation of the score accumulated value" means that such points P1 are substantially excluded from the accumulation target of the score accumulated value; for example, a score of zero may be assigned to these points P1, or no score may be assigned to these points P1. In the example shown in FIG. 8, points P1 behind the straight line candidate at a specified distance or more are assigned with a score of zero. When this calculation method of the score accumulated value is adopted, in the example shown in FIG. 7, the straight line candidate L1 is selected as the straight line corresponding to the front surface of the pallet 10. The straight line detection unit 130 may detect a plurality of straight lines having a high priority indicated by the score accumulated value.

As shown in FIG. 5, the pallet detection device 100 determines whether the straight line detection unit 130 detects the straight line (step S5). If it is determined that the straight line is not detected (step S5; No), the pallet detection device 100 performs a processing of step S10. If it is determined that the straight line is detected (step S5; Yes), the pallet detection device 100 performs a first both-end detection processing (step S6).

Specifically, in the first both-end detection processing, the both-end detection unit 140 extracts one or more line segments from the straight line selected by the straight line detection unit 130, and searches the extracted one or more line segments for one line segment or a combination of two or more line segments having an end-to-end length corresponding to an end-to-end length of the pallet 10 determined from design information. The "length corresponding to . . ." means the length within tolerance. The design information of the pallet 10 indicates the dimension of the pallet 10 (e.g., end-to-end length, position and spacing of holes 11) and is read from the memory of the pallet detection device 100, for example. If the search in the first both-end detection processing is successful, the both-end detection unit 140 estimates both ends of the found line segment or combination of two or more line segments as both ends of the pallet 10.

Figure 9:
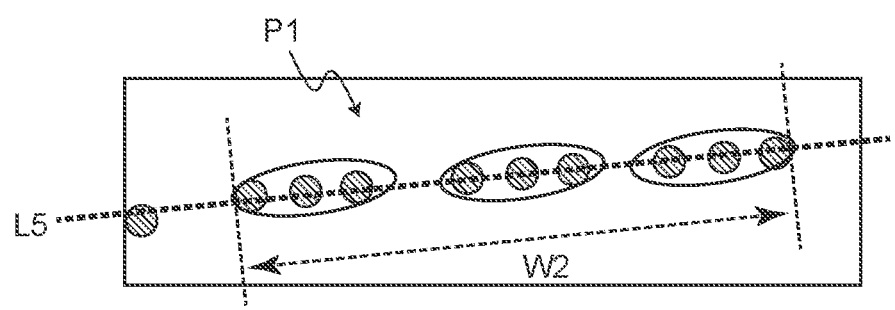
FIG. 9 is a schematic diagram showing an example of a first both-end detection processing performed by a pallet detection device according to an embodiment.

FIG. 9 is a schematic diagram showing an example of the first both-end detection processing performed by the pallet detection device 100 according to an embodiment. As shown in FIG. 9, for example, the both-end detection unit 140 extracts three line segments (sets of points P1 surrounded by circles) from the selected straight line L5, and searches for one line segment or a combination of two or more line segments having an end-to-end length W2 corresponding to the end-to-end length of the pallet 10. In the example shown in FIG. 9, as a result of search, the end-to-end length of the combination of three line segments is detected.

The pallet detection device 100 determines whether both ends of the pallet 10 are detected by the first both-end detection processing (step S7). If it is determined that both ends of the pallet 10 are detected (step S7; Yes), the pallet detection device 100 performs a processing of step S12. If it is determined that both ends of the pallet 10 are not detected (step S7; No), the pallet detection device 100 performs a second both-end detection processing (step S8).

In the second both-end detection processing, if a gap between adjacent line segment end points of the extracted two or more line segments or a gap between an edge of the detection target region and a line segment end point is equal to or greater than a reference value, the both-end detection unit 140 detects both ends of the pallet 10 so that an end point of the gap is one end of the pallet 10, and a point that is separated from the one end by a length corresponding to the end-to-end length of the pallet 10 is the other end of the pallet 10. The detection target region in this case is preferably the first detection target region A1, not the second detection target region A2, in order to make it easier to find the gap.

Figure 10:
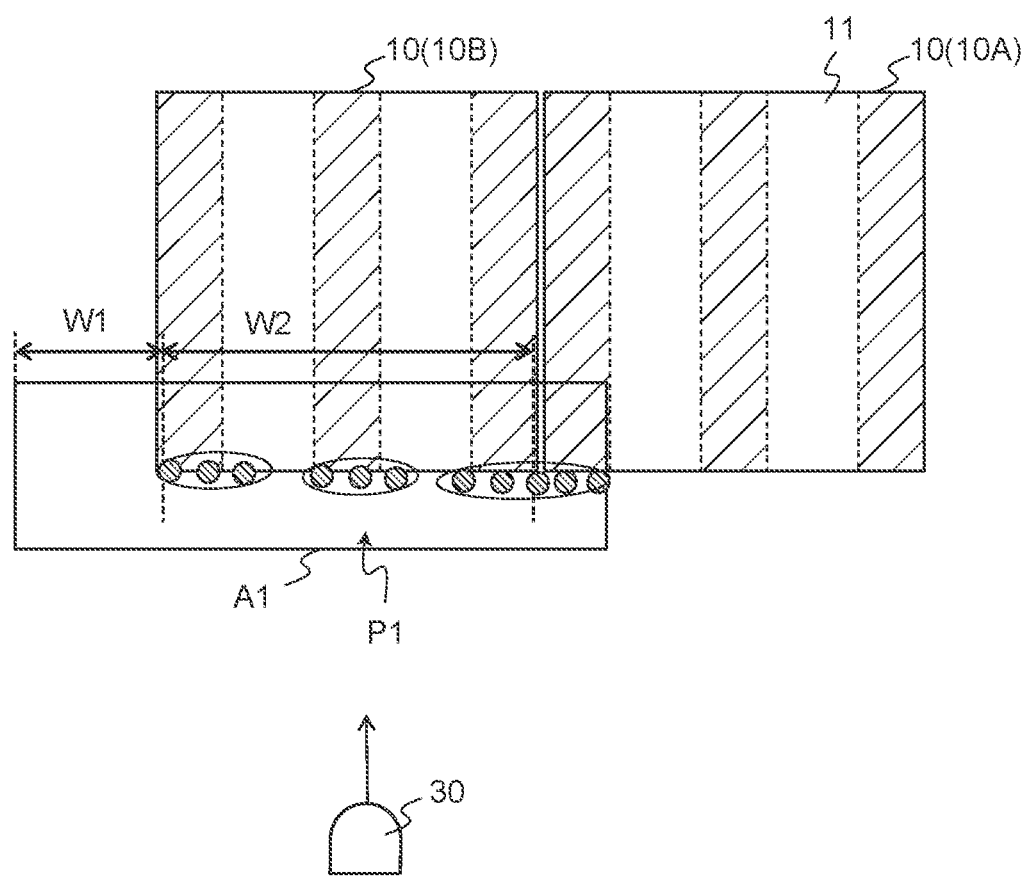
FIG. 10 is a schematic diagram showing an example of a second both-end detection processing performed by a pallet detection device according to an embodiment.

FIG. 10 is a schematic diagram showing an example of the second both-end detection processing performed by the pallet detection device 100 according to an embodiment. In this example, another pallet 10 (10A) is located to the right of the pallet 10 (10B) to be detected. The pallet 10 (10B) to be detected and a part of the other pallet 10 (10A) are contained within the first detection target region A1. Further, these two pallets 10 are close together, and there is almost no gap. In this case, the first both-end detection processing fails.

However, in the second both-end detection processing, if the width W1 of the gap between the left end of the pallet 10 (10B) to be detected and the left end of the first detection target region A1 is equal to or larger than a reference value, the end point of the line segment corresponding to the right end point of the gap (the left end of the pallet 10 to be detected) is detected as one end of the pallet 10 (10B), and a position separated from this end along the line segment by the length W2 corresponding to the end-to-end length of the pallet 10 is detected as the other end of the pallet 10 (10B). Thus, both ends of the pallet 10 (10B) are detected in the example shown in FIG. 10.

In FIG. 10, if another pallet 10 (not shown) is also located to the left of the pallet 10 (10B) to be detected, and is partially contained within the first detection target region A1, the gap between adjacent line segment end points of the extracted two or more line segments is examined. For example, if the distance between the right line segment composed of points P1 of the other pallet 10 (not shown) and the left line segment composed of points P1 of the pallet 10 (10B) to be detected is equal to or larger than a reference value, the left end of the left line segment composed of points P1 of the pallet 10 (10B) to be detected is detected as one end of the pallet 10 (10B), and a position separated from this end along the line segment by the length W2 corresponding to the end-to-end length of the pallet 10 is detected as the other end of the pallet 10 (10B).

The pallet detection device 100 determines whether both ends of the pallet 10 are detected by the second both-end detection processing (step S9). If it is determined that both ends of the pallet 10 are detected (step S9; Yes), the pallet detection device 100 performs a processing of step S12. If it is determined that both ends of the pallet 10 are not detected (step S9; No), the pallet detection device 100 performs a third both-end detection processing (step S10).

Figure 11:
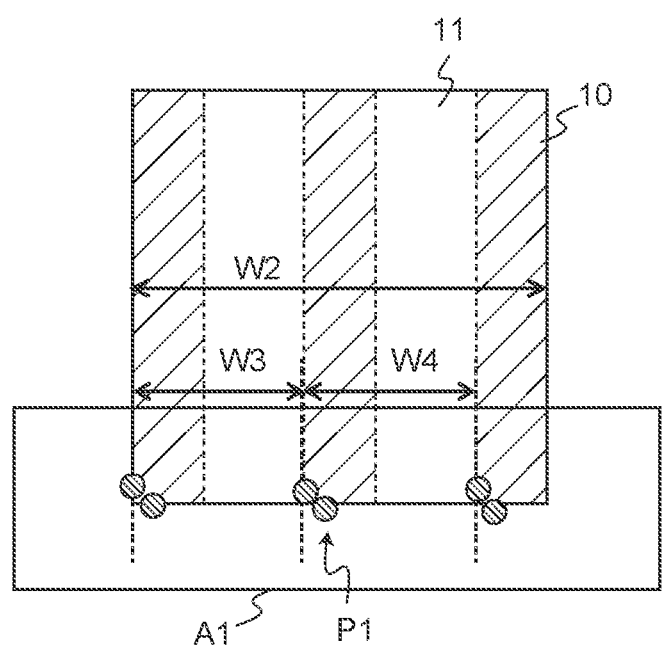
FIG. 11 is a schematic diagram showing an example of a third both-end detection processing performed by a pallet detection device according to an embodiment.
Figure 11:
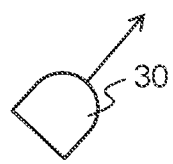

FIG. 11 is a schematic diagram showing an example of the third both-end detection processing performed by the pallet detection device 100 according to an embodiment. In the third both-end detection processing, for instance as shown in FIG. 11, the both-end detection unit 140 searches the point cloud P1 for three sets of points having spacings W3, W4 equal to the spacing between ends of the pallet 10 or ends of the holes 11 of the pallet 10, and detects both ends of the pallet 10 so that the forwardmost point (the point closest to the two-dimensional distance measurement device 30) of the three sets of points is one end of the pallet 10, and a point that is separated from the one end by a length corresponding to the end-to-end length (W2) of the pallet 10 is the other end of the pallet 10.

In the illustrated example, the two-dimensional distance measurement device 30 is located to the left of the pallet 10 and scans the pallet 10 from a direction oblique to the pallet 10. In this case, the sets of points near the three corners of the pallet 10 are acquired as the point cloud. Of these three pairs of points, for example, the leftmost point of the left pair is detected as one end of the pallet 10 since it is located furthest forward. A point separated from this end by the length W2 corresponding to the end-to-end length of the pallet 10 is detected as the other end. Thus, both ends of the pallet 10 are detected. In order to prevent false detections, detection may be determined as failure when there is a plurality of three pairs of points.

The pallet detection device 100 determines whether both ends of the pallet 10 are detected by the third both-end detection processing (step S11). If it is determined that both ends of the pallet 10 are detected (step S11; Yes), the pallet detection device 100 performs a line segment fitting (step S12).

Figure 12:
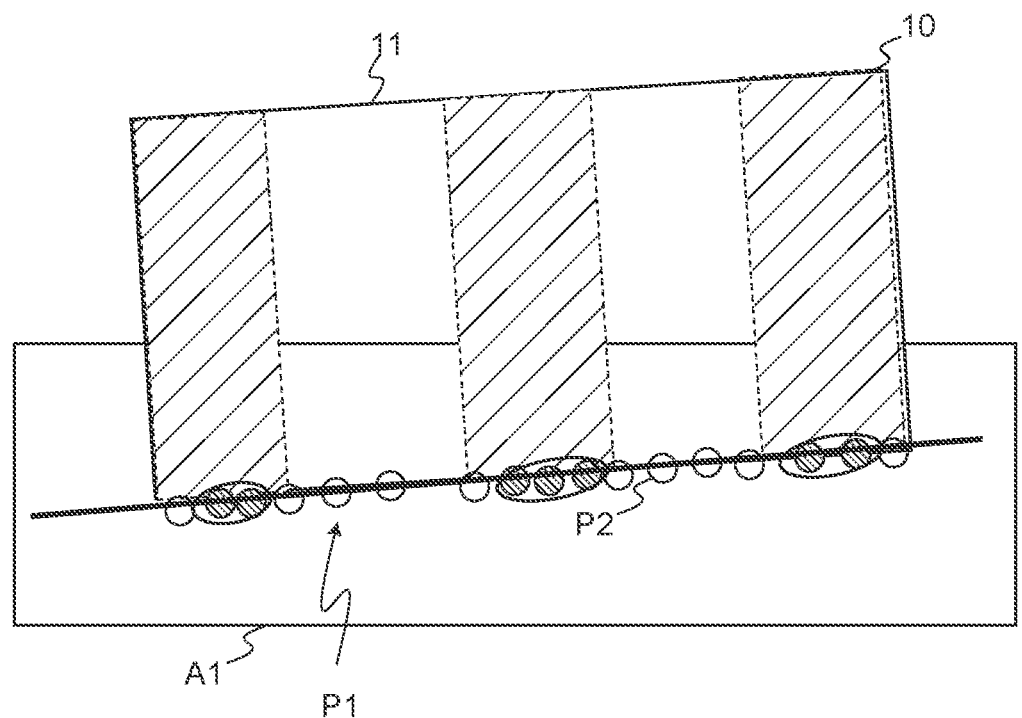
FIG. 12 is a schematic diagram showing an example of position and orientation of a pallet acquired by a pallet detection device according to an embodiment.

FIG. 12 is a schematic diagram showing an example of position and orientation of the pallet 10 acquired by the pallet detection device 100 according to an embodiment. In the line segment fitting, first, a line segment indicating the front surface of the pallet 10 is detected based on the straight line in which both ends of the pallet 10 are detected. In this case, for example, as shown in FIG. 12, the line segment detection unit 150 may exclude points P1 at the position presumed to be the position of the hole 11 of the pallet 10 from the point cloud P1, further exclude points P1 away from both ends of the line segment by a predetermined distance or more, and then use only the rest of points P1 to re-detect the line segment indicating the front surface of the pallet 10. In FIG. 12, points P2 excluded from the point cloud P1 are represented by white plots. The position of the hole 11 of the pallet 10 is estimated based on the detected both ends of the pallet 10 and the design information of the pallet 10. Further, the line segment detection unit 150 may re-detect the line segment indicating the front surface of the pallet 10 by the least squares method so as to pass closer to more points P1.

Further, the pallet detection device 100 calculates the position and orientation of the pallet 10 based on the line segment indicating the front surface of the pallet 10 finally detected (step S13). Specifically, the position/orientation acquisition unit 160 acquires the position and orientation of the pallet 10 based on the line segment detected by the line segment detection unit 150. At this time, the position/orientation acquisition unit 160 acquires the orientation of the pallet 10 from the slope of the line segment indicating the front surface of the pallet 10 finally detected and acquires the position of the pallet 10 based on the midpoint of the line segment indicating the front surface of the pallet 10 finally detected.

If it is determined that both ends of the pallet 10 are not detected (step S11; No), the pallet detection device 100 skips the processings of steps S12 and S13. The pallet detection device 100 outputs the detection result of the processing to the driving unit (not shown) of the forklift 200 (step S14).

The above-described process can solve the various problems described with reference to FIGS. 1B through 1E. For example, even when there is almost no gap between the pallet 10 (10B) and the pallet 10 (10A) as shown in FIG. 1B, the straight line corresponding to the front surface of the pallet 10 (10B) can be detected by the second both-end detection processing shown in FIG. 10. Even when the gap between the pallet 10 (10B) and the pallet 10 (10A) has a width equal to the distance D of the hole 11 as shown in FIG. 1C, the straight line corresponding to the front surface of the pallet 10 (10B) can be detected by the first both-end detection processing shown in FIG. 9.

As shown in FIG. 1D, even when the pallet 10 (10B) has an angular deviation, the pallet 10 (10B) can be transported by inserting the fork 201 of the forklift 200 based on the calculation result of the position and orientation of the pallet 10 (10B) in step S13. As shown in FIG. 1E, even when the pallet 10 (10B) is placed farther back than other pallets 10 (10A, 10C), the front surface of the pallet 10 can be detected by distinguishing points P1 on the front side from points P1 on the back side based on the calculation result of the score accumulated value of step S3.

The flow of the processing performed by the pallet detection device 100 has been described. The order of steps shown in FIG. 5 can be changed as appropriate. For example, the order of the second both-end detection processing and the third both-end detection processing may be reversed. In the straight line detection in step S4, a plurality of straight lines may be detected. In this case, the processings of steps S6, S8, and S10 may be performed for each of the plurality of straight lines. For example, the pallet detection device 100 may select a straight line out of the plurality of detected straight lines in the order of priority indicated by the score accumulation value, and perform a processing for detecting both ends of the pallet 10 based on the selected straight line (first both-end detection processing, second both-end detection processing, third both-end detection processing). The position/orientation acquisition unit 160 acquires the position and orientation of the pallet 10 based on the straight line in which both ends of the pallet 10 are detected.

In the processing shown in FIG. 11, if the search in the first both-end detection processing fails, an additional processing (second both-end detection processing and third both-end detection processing) different from the first both-end detection processing is performed. Such an additional processing may be omitted, or the processing may be modified to include only one of the two both-end detection processing or the third both-end detection processing.

The present disclosure is not limited to the embodiments described above, but includes modifications to the embodiments described above, and embodiments composed of combinations of those embodiments.

Conclusion

The contents described in the above embodiments would be understood as follows, for instance.

(1) A pallet detection device (100) according to the present disclosure comprises: a point cloud acquisition unit (110) configured to acquire point cloud data indicating a point cloud (P1) measured by a two-dimensional distance measurement device (30) on a depth map; a straight line detection unit (130) configured to detect a straight line corresponding to a front surface of a pallet (10) based on the point cloud (P1) in a region presumed to include the front surface of the pallet (10) in the point cloud data; a line segment detection unit (150) configured to detect a line segment indicating the front surface of the pallet (10) based on the straight line; and a position/orientation acquisition unit (160) configured to acquire the position and orientation of the pallet (10) based on the line segment. The straight line detection unit (130) acquires one or more straight line candidates as candidates for the straight line, assigns, for each of the one or more straight line candidates, a score to the point cloud (P1) so that points (P1) in front of the straight line candidate at a specified distance or more are assigned with a score with a constant whose priority in selection is lower than the rest of points (P1), and selects the straight line from the one or more straight line candidates based on a score accumulated value obtained by accumulating the score for the point cloud (P1) in the region presumed to include the front surface of the pallet (10).

When three-dimensional data is acquired while moving 2D-LiDAR in the vertical direction as in Patent Document 1, a large number of observation points due to reflected light from the front surface of the pallet (10) are obtained on the same plane, and the straight line corresponding to the front surface of the pallet (10) can be detected relatively easily. However, when trying to extract the straight line corresponding to the front surface of the pallet (10) in one scan without moving 2D-LiDAR in the vertical direction, it is difficult to distinguish observation points due to the reflected light from the front surface of the pallet (10) from observation points due to the reflected light reflected from holes of the pallet, so that a straight line behind the front surface of the pallet (10) may be extracted.

In other words, if a line segment is detected based on the point cloud in the hole (11) behind the front surface of the pallet (10) (point cloud (P1) reflected by the side or top surface in the hole (11)), the detection accuracy is reduced. In this regard, according to the above configuration, the score accumulated value is obtained such that a straight line candidate with many points (P1) in front thereof has a low priority in selection, and a straight line is selected based on the score accumulated value. This makes it easier to detect the line segment based on the point cloud (P1) on the front surface of the pallet (10). As a result, the straight line corresponding to the front surface of the pallet (10) can be accurately extracted without moving the two-dimensional distance measurement device (30) in the vertical direction, so that the position and orientation of the pallet (10) can be detected in a short time.

If the score given to the point cloud (P1) on the front side is a variable such that the priority decreases significantly with a distance from the straight line candidate, there is a risk that a line segment is detected on the front side of the pallet (10) due to the influence of outliers (for example, the influence of a reflection source by an object other than the target pallet (10)). In this regard, according to the above configuration, the score is a constant, which reduces such a risk. Therefore, it is possible to improve the detection accuracy.

(2) In some embodiments, in the above configuration (1), in calculation of the score accumulated value, the straight line detection unit (130) assigns a higher priority score to points (P1) within the specified distance from the straight line candidate than to points (P1) in front of the straight line candidate at the specified distance or more, and the closer to the straight line candidate, the higher the priority of the score.

According to the above configuration, a higher score is assigned to points (P1) within the specified distance from the straight line candidate than to points (P1) in front of the straight line candidate at the specified distance or more, and the closer to the straight line candidate, the higher the score. Accordingly, the more points there are in the vicinity of the straight line candidate, the easier it is to select this straight line candidate as the straight line. Thus, it is possible to detect the line segment that is most likely to be the front surface of the pallet (10).

(3) In some embodiments, in the above configuration (1) or (2), in calculation of the score accumulated value, the straight line detection unit (130) excludes points (P1) behind the straight line candidate at the specified distance or more from accumulation of the score accumulated value.

Points (P1) backward of the front surface of the pallet (10) are most likely points (P1) in the hole (11). The positions of such points (P1) are noise in the detection of the front surface of the pallet (10), and should therefore not be considered as a score used for straight line selection. If they are considered, the accuracy may be reduced. In this regard, according to the above configuration, points (P1) behind the straight line candidate at the specified distance or more are excluded from accumulation of the score accumulated value. Thus, it is possible to reduce a risk of accuracy degradation due to the influence of points (P1) in the hole (11).

(4) In some embodiments, in any one of the above configurations (1) to (3), the pallet detection device comprises a both-end detection unit (140) configured to detect both ends of the pallet (10). The straight line detection unit (130) detects a plurality of the straight lines having a high priority indicated by the score accumulated value, the both-end detection unit (140) selects the straight line in the order of the priority indicated by the score accumulated value among the plurality of detected straight lines, and performs a processing for detecting both ends of the pallet (10) based on the selected straight line, and the position/orientation acquisition unit (160) acquires position and orientation of the pallet (10) based on the straight line in which both ends of the pallet (10) are detected.

Even the straight line selected by the straight line detection unit (130) may not be appropriate as a straight line to be used for line segment detection. In this regard, according to the above configuration, the processing for detecting both ends of the pallet (10) is performed by selecting the straight line in the order of the priority indicated by the score accumulated value, and the position and orientation of the pallet (10) are obtained based on the successful straight line. As a result, the detection accuracy is improved.

(5) In some embodiments, in any one of the above configurations (1) to (4), the pallet detection device comprises a region setting unit (120) configured to set a first detection target region (A1) having a width larger than a slot (20) in which the pallet (10) is placed. The straight line detection unit (130) detects the straight line based on the point cloud (P1) in the first detection target region (A1).

According to the above configuration, the first detection target region (A1) having a width larger than that of the slot (20) is used to extract the point cloud (P1). Thus, even if the first detection target region (A1) is set at a position slightly displaced from the position of the slot (20) due to an error, the point cloud (P1) at the position of the slot (20) can be acquired without omissions.

(6) In some embodiments, in the above configuration (5), the region setting unit (120) further sets a second detection target region (A2) having a width smaller than the first detection target region (A1), and the straight line detection unit (130) acquires a straight line connecting two points selected from the point cloud (P1) in the second detection target region (A2) as the straight line candidate, includes points (P1) outside the second detection target region (A2) and within the first detection target region (A1) in the straight line candidate having a high priority indicated by the score accumulated value, and selects the straight line candidate including the points (P1) as the straight line.

If the detection target region is wide, the point cloud (P1) of the pallet (10) adjacent to the target pallet (10) may enter the detection target region. In this case, even if a straight line suitable for detecting the line segment indicating the front surface of the target pallet (10) is detected, the priority of the score accumulated value may be reduced by the point cloud (P1) caused by the front surface of the adjacent pallet (10) located further forward. In this case, the detection accuracy may decrease. In this regard, according to the above configuration, since the score accumulated value is calculated for the point cloud (P1) in the second detection target region (A2) having a width smaller than the first detection target region (A1), the influence of the adjacent pallet (10) on the score accumulated value can be reduced. In addition, since the point cloud (P1) in the first detection target region (A1) is also included when detecting the straight line, it is possible to reduce the possibility that the point cloud (P1) of the target pallet (10) included in the first detection target region (A1) may be omitted from extraction when selecting the straight line.

(7) In some embodiments, in any one of the above configurations (1) to (6), the pallet detection device comprises an information acquisition unit (170) configured to acquire information indicating the self-position and information indicating the position of the slot (20) in which the pallet (10) is placed. The point cloud acquisition unit (110) is configured to identify the region presumed to include the front surface of the pallet (10), based on the information acquired by the information acquisition unit (170).

According to the above configuration, it is possible to narrow down the region where the point cloud (P1) should be acquired. Further, when multiple pallets (10) are adjacent to each other, information indicating the position of the slot (20) can be used to reduce a risk of acquiring the point cloud (P1) of the pallet (10) whose position and orientation is not the detection target.

(8) In some embodiments, in any one of the above configurations (1) to (7), the pallet detection device comprises a both-end detection unit (140) configured to detect both ends of the pallet (10). The both-end detection unit (10) extracts one or more line segments from the straight line, performs a first both-end detection processing for searching the extracted one or more line segments for one line segment or a combination of two or more line segments having an end-to-end length corresponding to an end-to-end length of the pallet (10) determined from design information, and if the search in the first both-end detection processing is successful, estimates both ends of the line segment or the combination of two or more line segments as both ends of the pallet (10).

According to the above configuration, it is possible to acquire one line segment or a combination of two or more line segments that are estimated as both ends of the pallet (10). Since information about the holes (11) in the pallet (10) is not used, even in situations where the holes (11) cannot be recognized, the search by the first both-end detection processing is not affected, thus improving robustness.

(9) In some embodiments, in the above configuration (8), if the search in the first both-end detection processing fails, the both-end detection unit (140) performs an additional processing, different from the first both-end detection processing, for detecting both ends of the pallet (10).

It is possible that the first both-end detection processing cannot find one line segment or a combination of two or more line segments that can be estimated as both ends of the pallet (10). For example, when the target pallet (10) is close to the adjacent pallet (10), points (P1) of these pallets (10) may be detected as one continuous line segment. For example, due to the angle of incidence of the measurement light to the pallet (10), there is a possibility that only points (P1) at the corner of the pallet (10) can be observed. In this regard, according to the above configuration, even if the search in the first both-end detection processing fails, since both ends of the pallet (10) can be detected by performing the additional processing, it is easy to succeed in detecting both ends of the pallet (10).

(10) In some embodiments, in the above configuration (9), the additional processing includes a second both-end detection processing for, if a gap between adjacent line segment end points of the extracted two or more line segments or a gap between an edge of the detection target region and a line segment end point is equal to or greater than a reference value, detecting both ends of the pallet (10) so that an end point of the gap is one end of the pallet (10), and a point that is separated from the one end by a length corresponding to the end-to-end length of the pallet (10) is the other end of the pallet (10).

Even if the first both-end detection processing is performed, when the target pallet (10) is close to the adjacent pallet (10), points (P1) of these pallets (10) may be detected as one continuous line segment. In this case, both ends of the pallet (10) may not be detected by the first both-end detection processing. In this regard, according to the above configuration, even if the detection by the first both-end detection processing fails, when a gap equal to or larger than a reference value is found, both ends of the pallet (10) can be detected.

(11) In some embodiments, in the above configuration (9) or (10), the additional processing includes a third both-end detection processing for searching the point cloud for three sets of points having a spacing equal to a spacing between ends of the pallet (10) or ends of holes (11) in the pallet (10), and detecting both ends of the pallet (10) so that the forwardmost point of the three sets of points is one end of the pallet (10), and a point that is separated from the one end by a length corresponding to the end-to-end length of the pallet (10) is the other end of the pallet (10).

For example, due to the angle of incidence of the laser light to the pallet (10), there is a possibility that only points (P1) at the corner of the pallet (10) can be observed. In this case, both ends of the pallet (10) may not be detected by the first both-end detection processing. In this regard, according to the above configuration, even if the detection by the first both-end detection processing fails, when two or more sets of points having a spacing equal to a spacing between ends of the pallet (10) or ends of holes (11) in the pallet (10) is found, both ends of the pallet (10) can be detected.

(12) In some embodiments, in any one of the above configurations (1) to (11), the straight line detection unit (130) acquires a straight line connecting two points selected by a RANSAC algorithm from the point cloud (P1) in the detection target region as the straight line candidate.

The above configuration enables robust estimation by removing outliers in line segment detection.

(13) In some embodiments, in any one of the above configurations (1) to (11), the straight line detection unit (130) acquires a straight line connecting two points selected from the point cloud (P1), one each from right and left sides of a widthwise center of a detection target region, as the straight line candidate.

According to the above configuration, since the number of combinations is reduced compared to the case where two points are randomly selected from the entire detection target region, the amount of arithmetic processing can be reduced, and the possibility of selection omissions can be reduced.

(14) In some embodiments, in any one of the above configurations (1) to (13), the two-dimensional distance measurement device 30 is a safety 2D-LiDAR with an obstacle detection function and an emergency stop function for a forklift (200).

According to the above configuration, the pallet (10) can be detected using 2D-LiDAR for safety of the forklift (200). This eliminates the need to install a dedicated sensor for pallet detection, thus reducing the cost.

Since the 2D-LiDAR for safety of the forklift (200) has a fixed height position, it cannot be applied to a configuration that detects the position and orientation of the pallet (10) while moving the laser sensor in the vertical direction. However, in the above configuration, such 2D-LiDAR is applicable since it can detect the position and orientation of the pallet (10) without moving the laser sensor in the vertical direction.

(15) A forklift according to the present disclosure comprises: the pallet detection device (100) described in any one of the above (1) to (14); a two-dimensional distance measurement device (30) for acquiring a point cloud (P1); and a driving unit configured to perform transport of a pallet (10) according to a detection result of the pallet detection device (100).

With this configuration, the forklift (200) can transport the pallet (10) based on the detection result of the pallet detection device (100).

(16) A pallet detection method according to the present disclosure comprises: a step of acquiring point cloud data indicating a point cloud (P1) measured by a two-dimensional distance measurement device (30) on a depth map; a step of detecting a straight line corresponding to a front surface of a pallet (10) based on the point cloud (P1) in a region presumed to include the front surface of the pallet (10) in the point cloud data; a step of detecting a line segment indicating the front surface of the pallet (10) based on the straight line; and a step of acquiring position and orientation of the pallet (10) based on the line segment. The step of detecting the straight line includes acquiring one or more straight line candidates as candidates for the straight line, assigning, for each of the one or more straight line candidates, a score to the point cloud (P1) so that points (P1) in front of the straight line candidate at a specified distance or more are assigned with a score with a constant whose priority in selection is lower than the rest of points (P1), and selecting the straight line from the one or more straight line candidates based on a score accumulated value obtained by accumulating the score for the point cloud (P1) in the region presumed to include the front surface of the pallet (10).

With this method, the straight line corresponding to the front surface of the pallet (10) can be accurately extracted without moving the two-dimensional distance measurement device (30) in the vertical direction, so that the position and orientation of the pallet (10) can be detected in a short time.

(17) A program according to the present disclosure is configured to cause a computer to execute: a process of acquiring point cloud data indicating a point cloud (P1) measured by a two-dimensional distance measurement device (30) on a depth map; a process of detecting a straight line corresponding to a front surface of a pallet (10) based on the point cloud (P1) in a region presumed to include the front surface of the pallet (10) in the point cloud data; a process of detecting a line segment indicating the front surface of the pallet (10) based on the straight line; and a process of acquiring position and orientation of the pallet (10) based on the line segment. The process of detecting the straight line includes acquiring one or more straight line candidates as candidates for the straight line, assigning, for each of the one or more straight line candidates, a score to the point cloud (P1) so that points (P1) in front of the straight line candidate at a specified distance or more are assigned with a score with a constant whose priority in selection is lower than the rest of points (P1), and selecting the straight line from the one or more straight line candidates based on a score accumulated value obtained by accumulating the score for the point cloud (P1) in the region presumed to include the front surface of the pallet (10).

With this program, the straight line corresponding to the front surface of the pallet (10) can be accurately extracted without moving the two-dimensional distance measurement device (30) in the vertical direction, so that the position and orientation of the pallet (10) can be detected in a short time.

The invention claimed is:

1. A pallet detection device, comprising:
a processor configured to:
acquire, by a point cloud acquisition unit, point cloud data-indicating a point cloud measured by a two-dimensional distance measurement device on a depth map;
detect, by a straight line detection unit, a straight line corresponding to a front surface of a pallet based on the point cloud in a region that includes the front surface of the pallet in the point cloud data;
detect, by a line segment detection unit, a line segment indicating the front surface of the pallet based on the straight line; and
acquire, by a position/orientation acquisition unit, position and orientation of the pallet based on the line segment,
wherein the straight line detection unit
acquires one or more straight line candidates as candidates for the straight line,
assigns, for each of the one or more straight line candidates, a score to the point cloud so that points in front of each straight line candidate at a specified distance or more are assigned with a score with a constant whose priority in selection is lower than all other points,
selects the straight line from the one or more straight line candidates based on a score accumulated value obtained by accumulating the score for the point cloud in the region that includes the front surface of the pallet, as a detection result, and outputs the detection result to a driving unit configured to perform transport of a pallet.

2. The pallet detection device according to claim 1, wherein, in calculation of the score accumulated value, the straight line detection unit assigns a higher priority score to points within the specified distance from each straight line candidate than to points in front of each straight line candidate at the specified distance or more, and the closer to each straight line candidate, the higher the priority of the score.

3. The pallet detection device according to claim 1, wherein, in calculation of the score accumulated value, the straight line detection unit excludes points behind the straight line candidate at the specified distance or more from accumulation of the score accumulated value.

4. The pallet detection device according to claim 1, wherein the processor is further configured to:
detect, by a both-end detection unit, both ends of the pallet,
wherein the straight line detection unit detects a plurality of straight lines having a high priority indicated by the score accumulated value,
wherein the both-end detection unit selects the straight line in order of priority indicated by the score accumulated value among the plurality of detected straight lines, and performs a processing for detecting both ends of the pallet based on the selected straight line, and
wherein the position/orientation acquisition unit acquires position and orientation of the pallet based on the straight line in which both ends of the pallet are detected.

5. The pallet detection device according to claim 1, wherein the processor is further configured to:
set, by a region setting unit, a first detection target region having a width larger than a slot in which the pallet is placed,
wherein the straight line detection unit detects the straight line based on the point cloud in the first detection target region.

6. The pallet detection device according to claim 5, wherein the region setting unit further sets a second detection target region having a width smaller than the first detection target region, and
wherein the straight line detection unit acquires a straight line connecting two points selected from the point cloud in the second detection target region as the straight line candidate, includes points outside the second detection target region and within the first detection target region in the straight line candidate having a high priority indicated by the score accumulated value, and selects the straight line candidate including the points as the straight line.

7. The pallet detection device according to claim 1, wherein the processor is further configured to:
acquire, by an information acquisition unit, information indicating a self-position and information indicating a slot position in which the pallet is placed,
wherein the point cloud acquisition unit is configured to identify the region that includes the front surface of the pallet, based on the information acquired by the information acquisition unit.

8. The pallet detection device according to claim 1, wherein the processor is further configured to:
detect, by a both-end detection unit, both ends of the pallet,
wherein the both-end detection unit
extracts one or more line segments from the straight line,
performs a first both-end detection processing for searching the extracted one or more line segments for one line segment or a combination of two or more line segments having an end-to-end length corresponding to an end-to-end length of the pallet determined from design information, and
if the search in the first both-end detection processing is successful, estimates both ends of the line segment or the combination of two or more line segments as both ends of the pallet.

9. The pallet detection device according to claim 8, wherein, if the search in the first both-end detection processing fails, the both-end detection unit performs an additional processing, different from the first both-end detection processing, for detecting both ends of the pallet.

10. The pallet detection device according to claim 9, wherein the additional processing includes a second both-end detection processing for, if a gap between adjacent line segment end points of the extracted two or more line segments or a gap between an edge of a detection target region and a line segment end point is equal to or greater than a reference value, detecting both ends of the pallet so that an end point of the gap is one end of the pallet, and a point that is separated from the one end by a length corresponding to the end-to-end length of the pallet is another end of the pallet.

11. The pallet detection device according to claim 9, wherein the additional processing includes a third both-end detection processing for searching the point cloud for three sets of points having a spacing equal to a spacing between ends of the pallet or ends of holes in the pallet, and detecting both ends of the pallet so that a forwardmost point of the three sets of points is one end of the pallet, and a point that is separated from the one end of the pallet by a length corresponding to the end-to-end length of the pallet is another end of the pallet.

12. The pallet detection device according to claim 1, wherein the straight line detection unit acquires a straight line connecting two points selected by a RANSAC algorithm from the point cloud in the detection target region as the straight line candidate.

13. The pallet detection device according to claim 1, wherein the straight line detection unit acquires a straight line connecting two points selected from the point cloud, one each from right and left sides of a widthwise center of a detection target region, as the straight line candidate.

14. The pallet detection device according to claim 1, wherein the two-dimensional distance measurement device is a safety 2D-LiDAR with an obstacle detection function and an emergency stop function for a forklift.

15. A forklift, comprising:
the pallet detection device according to claim 1;
a two-dimensional distance measurement device for acquiring a point cloud; and
a driving unit configured to perform transport of a pallet according to a detection result of the pallet detection device.

16. A pallet detection method, comprising:
acquiring point cloud data indicating a point cloud measured by a two-dimensional distance measurement device on a depth map;

detecting a straight line corresponding to a front surface of a pallet based on the point cloud in a region that includes the front surface of the pallet in the point cloud data;

detecting a line segment indicating the front surface of the pallet based on the straight line; and acquiring position and orientation of the pallet based on the line segment, wherein the detecting the straight line includes acquiring one or more straight line candidates as candidates for the straight line, assigning, for each of the one or more straight line candidates, a score to the point cloud so that points in front of the straight line candidate at a specified distance or more are assigned with a score with a constant whose priority in selection is lower than all other points, and selecting the straight line from the one or more straight line candidates based on a score accumulated value obtained by accumulating the score for the point cloud in the region that includes the front surface of the pallet, as a detection result, and outputting the detection result to a driving unit configured to perform transport of a pallet.

17. A non-transitory computer readable medium having stored thereon a program configured to cause a computer to execute:

a process of acquiring point cloud data indicating a point cloud measured by a two-dimensional distance measurement device on a depth map;

a process of detecting a straight line corresponding to a front surface of a pallet based on the point cloud in a region that includes, the front surface of the pallet in the point cloud data;

a process of detecting a line segment indicating the front surface of the pallet based on the straight line; and a process of acquiring position and orientation of the pallet based on the line segment, wherein the process of detecting the straight line includes acquiring one or more straight line candidates as candidates for the straight line, assigning, for each of the one or more straight line candidates, a score to the point cloud so that points in front of the straight line candidate at a specified distance or more are assigned with a score with a constant whose priority in selection is lower than all other points, and selecting the straight line from the one or more straight line candidates based on a score accumulated value obtained by accumulating the score for the point cloud in the region that includes the front surface of the pallet as a detection result, and outputting the detection result to a driving unit configured to perform transport of a pallet.

* * * * *